Nov. 3, 1925.  1,560,034
H. W. BREWER
PORTABLE MILLING MACHINE
Filed Aug. 25, 1924   2 Sheets-Sheet 2
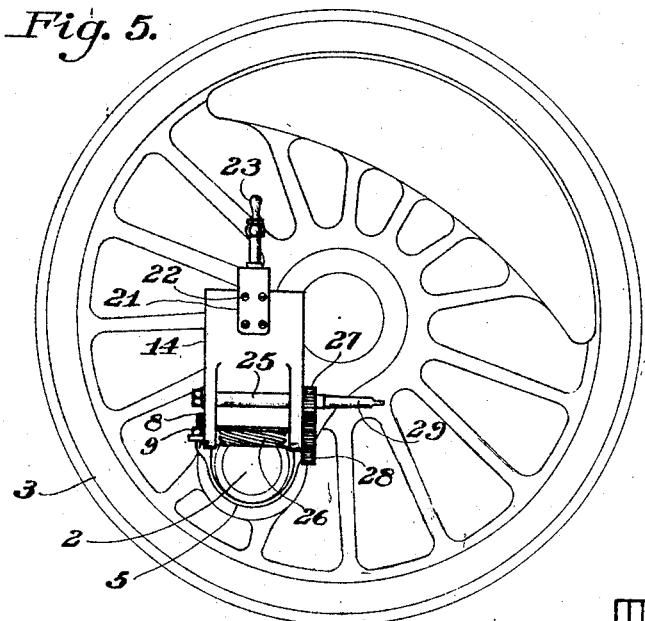
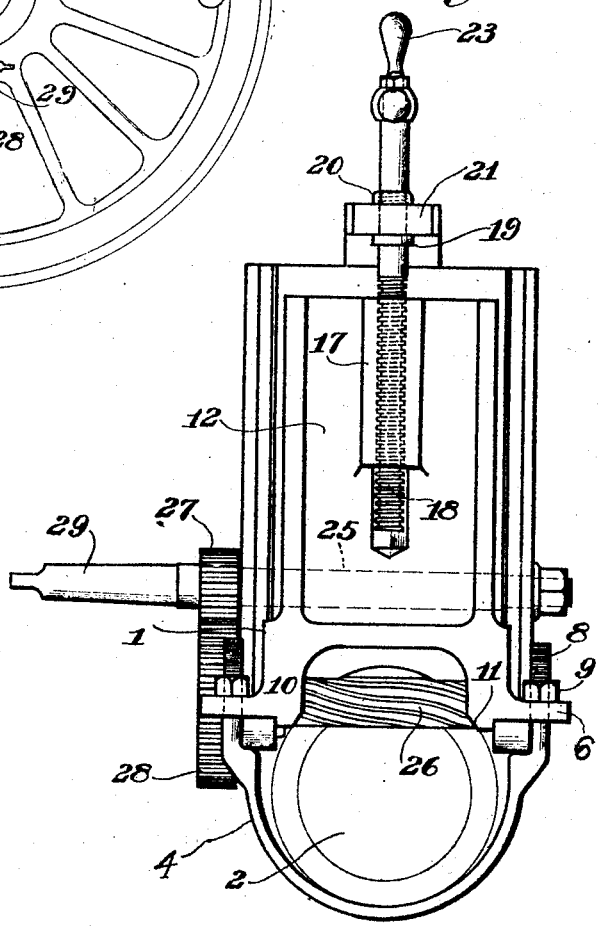
INVENTOR.
H. W. Brewer
BY James C. Bradley
ATTORNEY Patented Nov. 3, 1925.

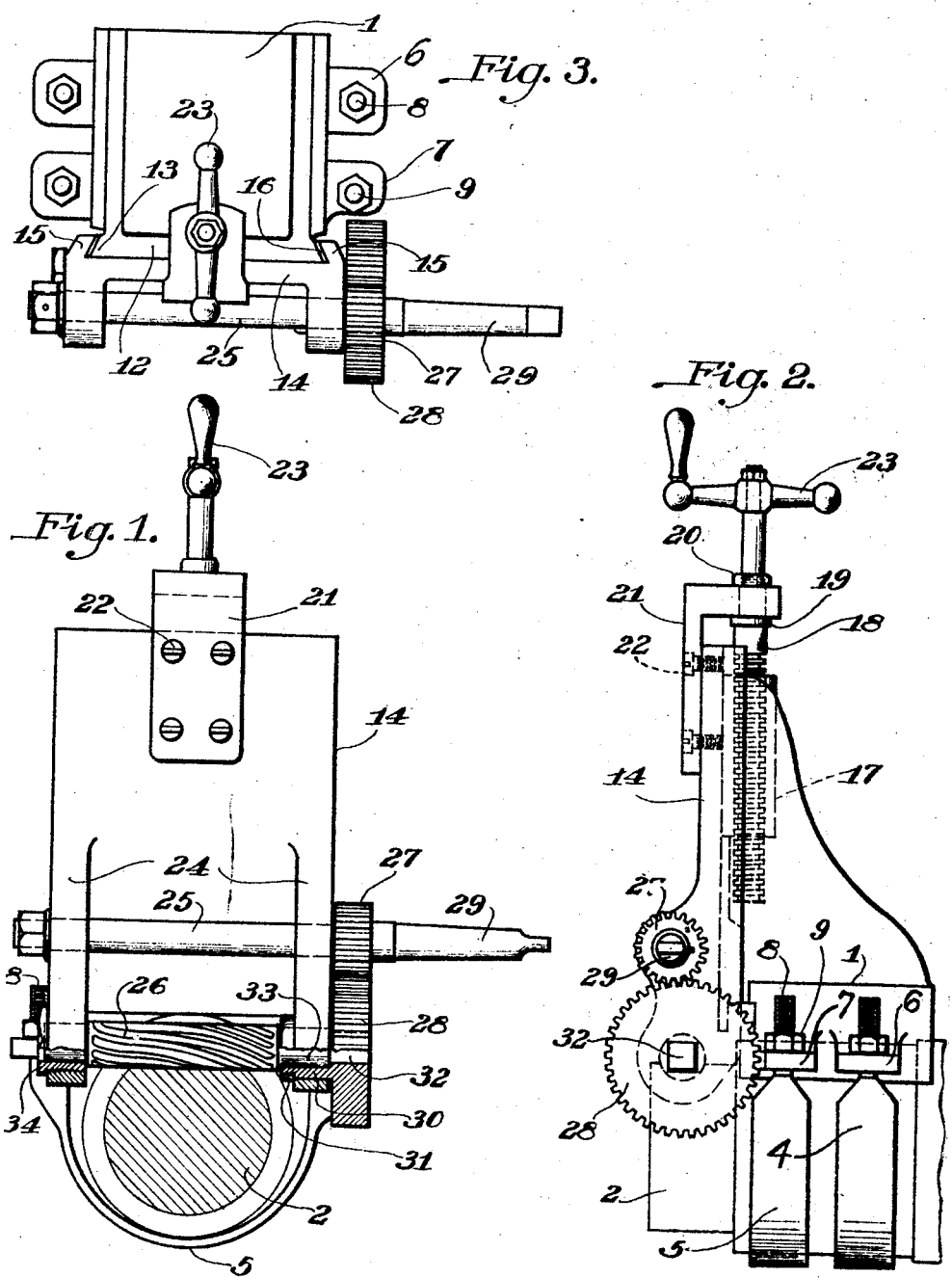

1,560,034

UNITED STATES PATENT OFFICE.

HUMPHRIES W. BREWER, OF DUBOIS, PENNSYLVANIA.

PORTABLE MILLING MACHINE.

Application filed August 25, 1924. Serial No. 733,879.

*To all whom it may concern:*

Be it known that I, HUMPHRIES W. BREWER, a citizen of the United States, and a resident of Dubois, in the county of Clearfield and State of Pennsylvania, have made a new and useful invention in Improvements in a Portable Milling Machine, of which the following is a specification.

The invention relates to portable milling machines, and particularly to machines for grooving crank pins of locomotives to receive the transverse securing bolts. The crank used for the outside valve gear of a locomotive, in addition to being secured by a key to the crank pin, is further held against lateral and rotary displacement by a bolt through the crank and pin, the center line of such bolt being tangent to the periphery of the pin.

In the customary method of procedure the hole in the crank for the bolt is drilled before assembling, then with the crank pin pressed to place in the wheel the crank is temporarily mounted on the pin in the proper position and the hole for the bolt is scribed from the crank upon the pin. The crank is then removed and the semicircular grooves cut by hand in the pin. To dispense with the hand labor of cutting the groove, the machine herein illustrated and described has been designed. Referring to the drawings:

Figure 1 is a front elevation of the machine mounted on a crank pin, with certain of the parts broken away to more clearly disclose the construction. Fig. 2 is a side elevation. Fig. 3 is a plan view. Fig. 4 is a rear elevation. And Fig. 5 is a front elevation showing the machine applied to the crank pin of a locomotive driver.

As illustrated, 1 is the bed of the machine seated upon the crank pin 2 of a locomotive driver 3 (Fig. 5), and rigidly secured thereto by means of the straps 4, 5. The bed is provided with the lugs 6, 7, through which the threaded ends 8 of the straps 4, 5 extend, such ends carrying the clamping nuts 9. The bed is also provided with the ribs 10 (Fig. 4) fitting over the crank pin and having their corners beveled as indicated at 11, so as to fit the curvature of such pin.

The bed 1 is provided with an upstanding guide plate 12 having the beveled edges 13 (Fig. 3), and upon this plate is mounted for vertical movement the carrier plate 14, such plate having the beveled flanges 15 fitting around the beveled edges 13 of the guide plate, suitable gibs or strips 16 being employed to take care of the wear and provide for adjustment.

The guide plate 12 has upon its rear side the lug or nut 17, through which is threaded the spindle 18 for giving the carrier plate its movement up and down. The spindle is swiveled by means of the collar 19 and nut 20 to the bracket 12, which in turn is secured to the carrier plate 14 by means of the machine screws 22. The spindle carries at its upper end the handle 23 by means of which it is rotated.

At the lower end of the carrier plate are a pair of ribs 24 in which are journalled the drive shaft 25 and milling cutter 26, driven therefrom through the intermediary of the pinion 27 and gear 28, the outer end of the shaft 25 being tapered to form a shank 29 of suitable dimensions to fit into the driving shaft of a pneumatic or other motor.

The gear 28 is provided with a hub 30 extending through the rib 24 as indicated in Fig. 1, which hub is threaded at its end and carries the nut 31. The milling cutter 26 has a square portion 32 at its extreme end fitting an opening of corresponding cross section through the gear 28, and a round portion 33 fitting an opening of corresponding cross section through the hub 30. At its other end the milling cutter is journalled in the thimble 34 threaded into the rib 24.

To operate, the machine is assembled and clamped upon the crank pin 2 in the position indicated in the drawings, with the milling cutter 26 opposite the portion of the periphery of the pin which it is desired to groove. A motor is then connected to the shank 29 of the drive shaft, and after starting such motor, the carrier plate 14 is fed downwardly by rotating the spindle 18, thus bringing the cutter into contact with the periphery of the pin 2, and this movement being continued until a groove of the desired depth is secured.

It will be seen that the machine is of simple construction, with a minimum number of parts, and that it may be very conveniently applied and operated to mill grooves of the character specified with speed and accuracy as compared with the hand method heretofore employed. The advantages of the construction will be readily apparent to those skilled in the art.

What I claim is:

In combination in a machine for milling transverse slots in crank pins, a bed plate having a longitudinal recess for fitting around the pin to be slotted and a guide member extending at right angles to said bed plate and rigid therewith, a tool carrier slidably mounted on said guide member for movement toward and from said pin, and provided at one end upon its front face with a pair of parallel ribs, a drive shaft and milling cutter shaft provided with a milling cutter mounted alongside each other in said ribs with the end of the milling cutter shaft of angular cross-section extending through one of the ribs, a spur gear on the outer side of said rib and having a hub fitting over said end of the shaft and extending through the rib, a nut threaded on the hub on the inner side of the rib, and a pinion on the drive shaft engaging said spur gear.

In testimony whereof, I have hereunto subscribed my name this 18th day of Aug., 1924.

H. W. BREWER.